United States Patent
Choi

(10) Patent No.: US 9,246,141 B2
(45) Date of Patent: Jan. 26, 2016

(54) SECONDARY BATTERY

(71) Applicant: Hyunjin Choi, Yongin-si (KR)

(72) Inventor: Hyunjin Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 231 days.

(21) Appl. No.: 13/794,885

(22) Filed: Mar. 12, 2013

(65) Prior Publication Data

US 2014/0186689 A1    Jul. 3, 2014

(30) Foreign Application Priority Data

Jan. 3, 2013 (KR) .................. 10-2013-0000723

(51) Int. Cl.
*H01M 2/06* (2006.01)
*H01M 2/30* (2006.01)
*H01M 2/04* (2006.01)

(52) U.S. Cl.
CPC .............. *H01M 2/0426* (2013.01); *H01M 2/30* (2013.01)

(58) Field of Classification Search
CPC ............ H01M 2/0426; H01M 2/0473; H01M 2/0217; H01M 2/04–2/0495
See application file for complete search history.

(56) References Cited

U.S. PATENT DOCUMENTS

| | | | |
|---|---|---|---|
| 2006/0216592 A1* | 9/2006 | Chun | 429/175 |
| 2010/0040943 A1* | 2/2010 | Kim | 429/163 |
| 2011/0100186 A1 | 5/2011 | Haas | |
| 2012/0208075 A1* | 8/2012 | Lim | 429/179 |
| 2013/0029211 A1* | 1/2013 | Seong et al. | 429/179 |

FOREIGN PATENT DOCUMENTS

| | | | |
|---|---|---|---|
| JP | 11-297292 A | 10/1999 | |
| JP | 2010-040445 A | 2/2010 | |
| KR | 10 2006-0087002 A | 8/2006 | |
| KR | 10 2006-0111844 A | 10/2006 | |
| KR | 10 2011-0015530 A | 2/2011 | |

* cited by examiner

*Primary Examiner* — Ula C Ruddock
*Assistant Examiner* — Thomas Parsons
(74) *Attorney, Agent, or Firm* — Lee & Morse, P.C.

(57) ABSTRACT

A secondary battery including an electrode assembly; a case accommodating the electrode assembly; a cap plate covering the case; and an electrode terminal electrically connected to the electrode assembly, wherein the cap plate includes at least one bending induction groove at a periphery of a central portion of the cap plate in a region between an edge and the central portion of the cap plate.

18 Claims, 5 Drawing Sheets

SECONDARY BATTERY

CROSS-REFERENCE TO RELATED APPLICATION

The present application claims priority under 35 U.S.C. §119 to Korean Patent Application No. 10-2012-0000723, filed on Jan. 3, 2013, in the Korean Intellectual Property Office, and entitled: "Secondary Battery," which is incorporated by reference herein in its entirety.

BACKGROUND

1. Field

Embodiments relate to a secondary battery.

2. Description of the Related Art

As portable wireless appliances (including video cameras, portable telephones, and portable computers) tend to have reduced weight while incorporating more functions, much research has been conducted on secondary batteries which are used as the driving power source thereof. For example, secondary batteries may include nickel cadmium batteries, nickel hydrogen batteries, nickel zinc batteries, and lithium secondary batteries. Lithium secondary batteries may be widely used in the cutting-edge electronic appliance field because they can be recharged, they can be made in a compact size while having larger capacity, and they have high operating voltage and high energy density per unit weight.

SUMMARY

Embodiments are directed to a secondary battery.

The embodiments may be realized by providing a secondary battery including an electrode assembly; a case accommodating the electrode assembly; a cap plate covering the case; and an electrode terminal electrically connected to the electrode assembly, wherein the cap plate includes at least one bending induction groove at a periphery of a central portion of the cap plate in a region between an edge and the central portion of the cap plate.

The cap plate may include a terminal hole at the central portion of the cap plate, the electrode terminal being exposed to the outside of the cap plate through the terminal hole.

The bending induction groove may include at least one first groove parallel with a widthwise direction of the cap plate.

The at least one first groove may extend along at least one of both sides of the terminal hole.

The at least one first groove may be between a short side of the terminal hole and a halfway portion of the central portion and a short side of the cap plate.

The at least one first groove may have a length that is longer than a width of the electrode terminal and that is shorter than a width of the terminal hole.

The at least one first groove may have a length that is 50% to 70% of a width of the cap plate.

The at least one first groove may have a width of about 0.5 mm to about 1 mm.

The at least one first groove may have a depth that is about 20% to about 50% of a thickness of the cap plate.

The bending induction groove may include at least one second groove parallel with a lengthwise direction of the cap plate.

The at least one second groove may extend along at least one of both sides of the terminal hole.

The at least one second groove may be between a long edge of the cap plate and a long side of the terminal hole.

The at least one second groove may have a length that is shorter than a length of the terminal hole.

The at least one second groove may have a depth that is about 20% to about 50% of a thickness of the cap plate.

The bending induction groove may include at least one first groove parallel with a widthwise direction of the cap plate, and at least one second groove parallel with a lengthwise direction of the cap plate.

The at least one first groove may be between a short side of the terminal hole and a halfway portion of the central portion and a short side of the cap plate, and the at least one second groove may be between a long edge of the cap plate and a long side of the terminal hole.

The at least one first groove may have a length that is longer than a width of the electrode terminal and that is shorter than a width of the terminal hole, and the at least one second groove may have a length that is shorter than a length of the terminal hole.

The bending induction groove may be on at least one of a top surface and a bottom surface of the cap plate.

The bending induction groove may be on both the top surface and the bottom surface of the cap plate.

The bending induction groove on the top surface of the cap plate may be vertically offset relative to the bending induction groove on the bottom surface of the cap plate.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
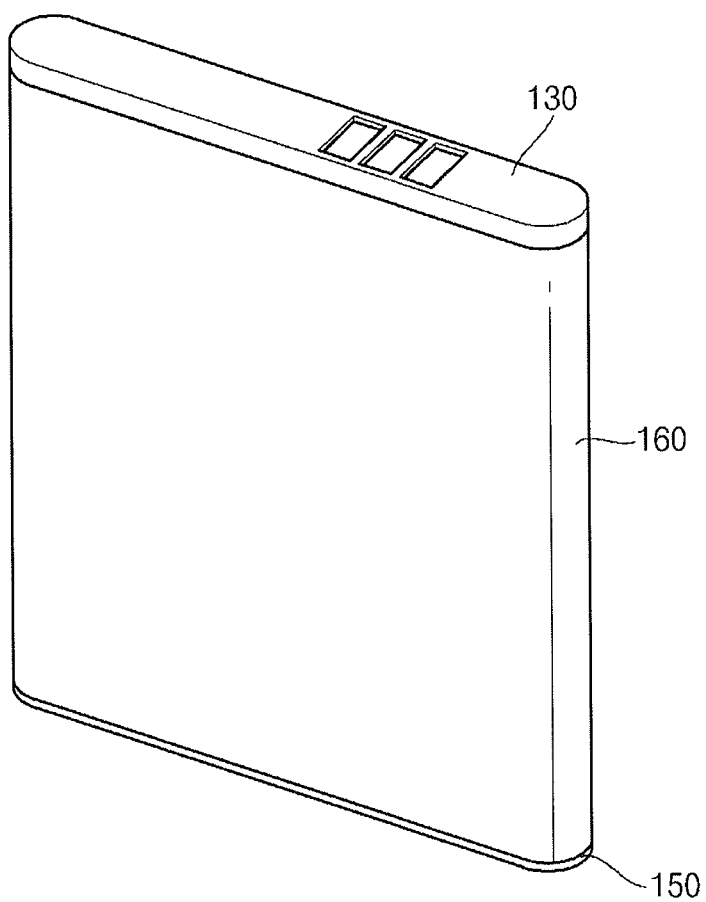
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when a layer is referred to as being "between" two elements, it can be the only element between the two elements, or one or more intervening elements may also be present. Like reference numerals refer to like elements throughout.

Figure 2:
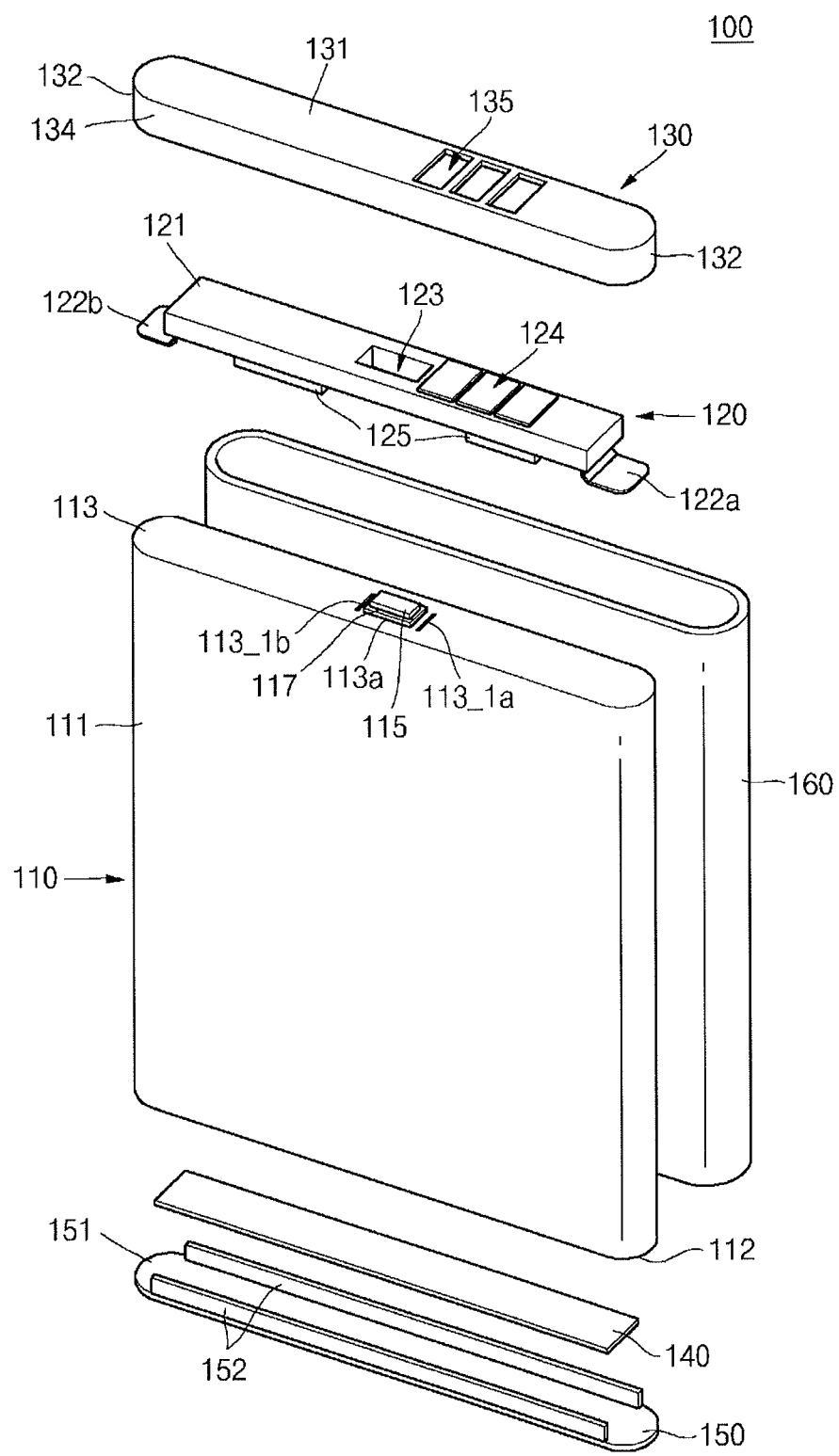
FIG. 2 illustrates an exploded perspective view of the battery pack of FIG. 1.

FIG. 1 illustrates a perspective view of a battery pack (100) according to an embodiment, and FIG. 2 illustrates an exploded perspective view of the battery pack of FIG. 1.

Referring to FIGS. 1 and 2, the battery pack 100 according to an embodiment may include a bare cell 110 and a protection circuit module (PCM) 120. The battery pack 100 may further include, e.g., a top case 130, an adhesion member 140, a bottom case 150, and a label 160.

The bare cell 110 (for providing electric energy) may include an electrode assembly (not shown), a case 111 accommodating the electrode assembly, a cap plate 113 covering or on the case 111, and a first electrode terminal 115 electrically connected to the electrode assembly and exposed to the outside while passing through the cap plate 113.

The electrode assembly may include a first electrode plate, a second electrode plate, and a separator. The first and second electrode plates with a separator disposed therebetween may be stacked and wound in a jelly-roll configuration. The first electrode plate may be coupled with a first electrode tab, and the second electrode plate may be coupled with a second electrode tab. The first electrode tab may be coupled with a first electrode terminal 115, and the second electrode tab may be coupled with a second electrode terminal. The second electrode terminal may be coupled with the case 111 by welding. In an implementation, the first electrode terminal 115 may be a negative electrode terminal and the second electrode terminal may be a positive electrode terminal. Accordingly, the second electrode terminal may correspond to an outer surface of the bare cell 110, excluding the first electrode terminal 115, e.g., the case 111 and the cap plate 113. The first electrode terminal 115 may be exposed to the outside of the cap plate 113 while passing through the cap plate 113 through a terminal hole 113a. The first electrode terminal 115 may be electrically insulated from the case 111 and the cap plate 113 by an insulation gasket 117 surrounding the first electrode terminal 115.

The case 111 may be formed of a roughly box-shaped metal, e.g., aluminum or an aluminum alloy that is light in weight and ductile. Although not shown, the case 111 may have an open part on its top surface and the electrode assembly may be housed in the case 111 through the open part.

The cap plate 113 may be sized and shaped to correspond to the open part of the case 111. For example, the cap plate 113 may be formed of a metal plate having a predetermined length (e.g., in a major axis or X-axis direction, see FIG. 3), width (e.g., in a minor axis or Y-axis direction, see FIG. 3), and thickness, and may be, e.g., an aluminum plate or an aluminum alloy plate. The cap plate 113 may cover the open part of the case 111 and may be coupled with the case 111 by welding. Accordingly, the cap plate 113 may have the same polarity as the case 111 and may serve as the second electrode terminal. The cap plate 113 may include the terminal hole 113a and at least one bending induction groove. The terminal hole 113a may be centrally formed in the cap plate 113, e.g., may be at a central portion of the cap plate 113, and the first electrode terminal 115 may pass therethrough. Accordingly, the first electrode terminal 115 may be exposed to the outside of the cap plate 113 through the terminal hole 113a.

The at least one bending induction groove may be formed at a periphery of the terminal hole 113a in a region between an edge Ecap of the cap plate 113 and the terminal hole 113a. When a compressive force is laterally applied to the bare cell 110, the bending induction groove may cause the bare cell 110 to be symmetrically bent in the left-and-right direction about a longitudinal axis. The bending induction groove of the cap plate 113 will be described below in more detail.

The PCM 120 may include a circuit board 121, a first support member 122a, a second support member 122b, and an electric circuit element 125. The PCM 120 may be coupled with a top portion of the bare cell 110 and may control the overall operation of the bare cell 110, including charging and discharging of the bare cell 110.

The circuit board 121 may be a printed circuit board having an interconnection pattern printed thereon, and may be formed of a plate elongated in a lengthwise (e.g., X-axis) direction of the top surface of the bare cell 110. The circuit board 121 may have a width corresponding to the top surface of the bare cell 110, e.g., the cap plate 113. A board hole 123 may be centrally formed in the circuit board 121. The first electrode terminal 115 of the bare cell 110 may be electrically connected to a first electrode lead plate (not shown) of the circuit board 121 through the board hole 123. The first electrode lead plate may be electrically connected to a bottom surface of the circuit board 121 and may be electrically connected to the first electrode terminal 115 by welding. The bottom surface of the circuit board 121 may be a surface facing a top surface of the cap plate 113.

An external terminal 124 electrically connected to an external load or a charger may be formed on a top surface of the circuit board 121. The top surface of the circuit board 121 may face a cover plate 131 of the top case 130.

The first support member 122a and the second support member 122b may be positioned in a vicinity of opposite ends of the bottom surface of the circuit board 121. In addition, the first support member 122a and the second support member 122b may be structures having a predetermined height and may allow the circuit board 121 to face the cap plate 113 while being spaced apart from the cap plate 113. Accordingly, the PCM 120 may be coupled with the bare cell 110 while being supported at the top portion of the bare cell 110 by the first support member 122a and the second support member 122b. At least one of the first and second support members 122a and 122b may be made of a conductive material to serve as a second electrode lead plate electrically connect the circuit board 121 to the second electrode terminal of the bare cell 110, e.g., the cap plate 113. The support member serving as the second electrode lead plate may be made of, e.g., nickel.

The electric circuit element 125 may be mounted on the bottom surface of the circuit board 121. The electric circuit element 125 may include, e.g., a control IC, a charge/discharge switch, a thermal fuse, or the like.

The top case 130 may include a cover plate 131 and a sidewall 134 downwardly extending from the cover plate 131. The PCM 120 may be accommodated in an internal space of the top case 130. The cover plate 131 may have roughly the same shape as the top surface of the bare cell 110. A through-hole 135 may be formed in the cover plate 131 to be located corresponding to the external terminal 124. Accordingly, the external terminal 124 of the PCM 120 may be exposed to the outside through the through-hole 135.

An internal surface of the cover plate 131 may contact the top surface of the circuit board 121 of the PCM 120. The sidewall 134 may include opposite ends 132 positioned at lengthwise opposite ends of the top case 130.

The adhesion member 140 may be a double-sided tape configured such that the bottom surface of the case 111 and a bottom plate 151 of the bottom case 150 are adhered to each other.

The bottom case 150 may include a bottom plate 151 and two extension parts 152 upwardly extending from the bottom plate 151. The bottom plate 151 may have roughly the same shape as the bottom surface of the bare cell 110 and may be adhered to a bottom surface 112 of the bare cell 110 by the adhesion member 140. The two extension parts 152 may cover bottom portions of two long side walls of the bare cell 110.

The label 160 may be adhered to side surfaces of the bare cell 110. The label 160 may cover a portion of the top case 130 and the extension parts 152 of the bottom case 150.

Hereinafter, the bending induction groove of the cap plate 113 according to the present embodiment will be described in more detail with reference to the accompanying drawings.

Figure 3:
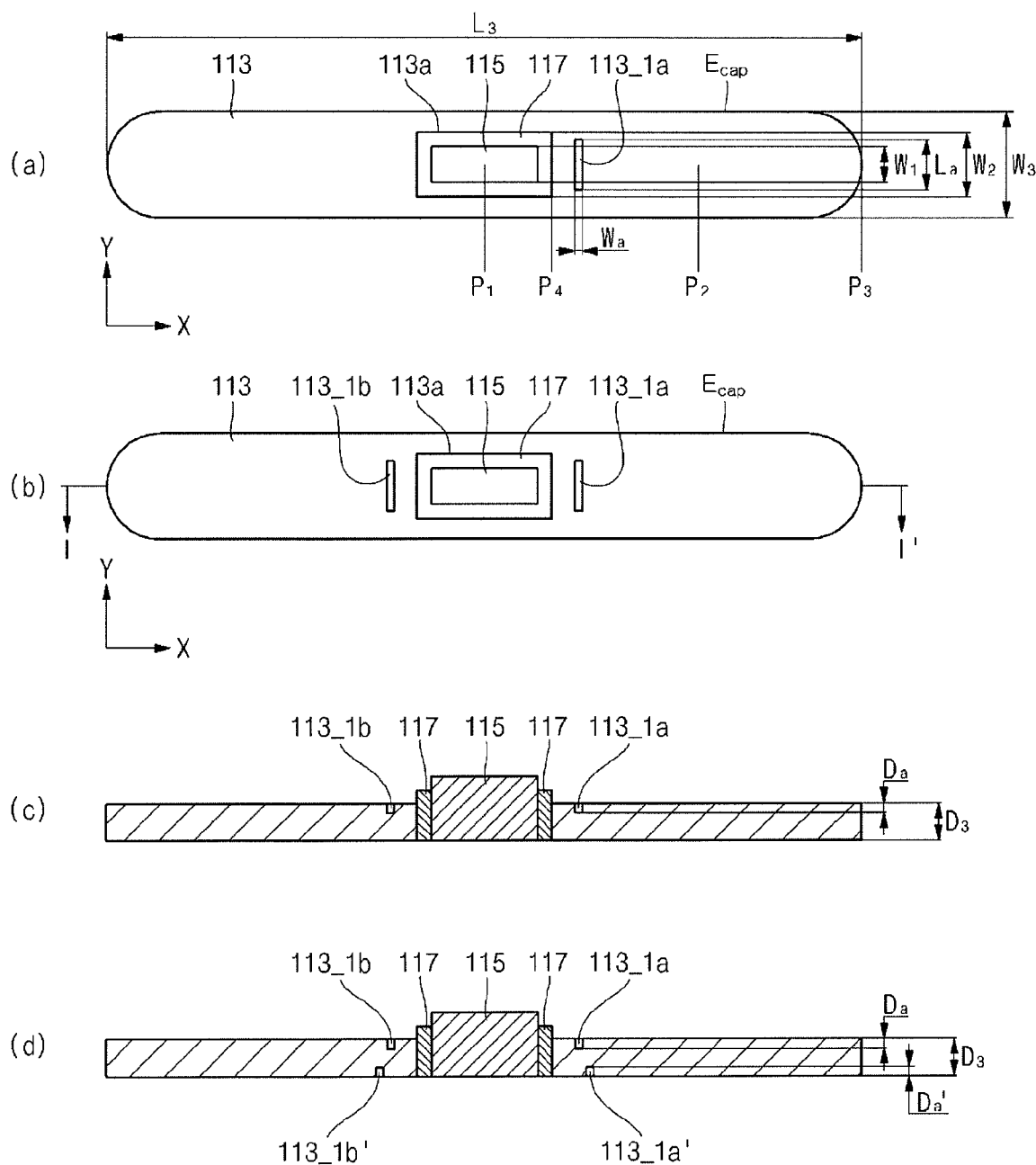
FIG. 3 illustrates a view of a configuration of first grooves in a cap plate according to an embodiment.

FIG. 3 illustrates a view of a configuration of first grooves (113_1a and 113_1b) in the cap plate (113) according to an embodiment. For example, FIGS. 3(a) and 3(b) illustrate top views of the cap plate 113, and FIGS. 3(c) and 3(d) illustrate sectional views of the cap plate 113 taken along the line I-I' of FIG. 3(b). For a better understanding of first grooves 113_1a and 113_1b, a first electrode terminal 115 and an insulation gasket 117 are both shown in FIG. 3.

As shown in FIGS. 3(a) and 3(b), a bending induction groove of the cap plate 113 may include at least one first groove, e.g., first grooves 113_1a and 113_1b, formed or extending in parallel with a widthwise (e.g., minor axis or Y-axis) direction of the cap plate 113. For the sake of convenient explanation, the first grooves 113_1a and 113_1b will be described below by defining the same as a first_first groove 113_1a and a second_first groove 113_1b according to the location at which they are formed in view of the terminal hole 113a. For example, as shown in FIG. 3(a), the first_first groove 113_1a may be formed adjacent to the terminal hole 113a and spaced apart from the terminal hole 113a in the X-axis direction. In addition, as shown in FIG. 3(b), the second_first groove 113_1b may also be adjacent to the terminal hole 113a and spaced apart from another side of the terminal hole 113a in the X-axis direction. For example, the first grooves 113_1a and 113_1b may extend along at least one of both sides of the terminal hole 113a.

FIG. 3 shows that one of the first grooves 113_1a and 113_1b may be formed at one side of the terminal hole 113a, and/or another of the first grooves 113_1a and 113_1b may be formed at another side of the terminal hole 113a. However, in an implementation, one or more of the first grooves 113_1a and 113_1b may be formed at one side or both sides of the terminal hole 113a. For example, a multitude or plurality of first_first grooves 113_1a may be formed along the terminal hole 113a and spaced apart from the terminal hole 113a in the X-axis direction. In another implementation, a multitude of second_first grooves 113_1b may be formed along the terminal hole 113a and spaced apart from the terminal hole 113a in the X-axis direction. In another implementation, a multitude of first_first grooves 113_1a and a multitude of second_first grooves 113_1b may be formed along the terminal hole 113a and spaced apart from the terminal hole 113a in the X-axis direction.

In addition, FIG. 3 shows that the first grooves 113_1a and 113_1b may be formed in such a manner as indicated by solid lines, e.g., as distinct, continuous grooves. However, in an implementation, the first grooves 113_1a and 113_1b may be formed in such a manner as indicated by dotted lines or a combination of solid and dotted lines, e.g., as discontinuous grooves.

FIGS. 3(a) to 3(c) show that the first grooves 113_1a and 113_1b may be formed on a top surface of the cap plate 113. However, in an implementation, as shown in FIG. 3(d), first grooves 113_1a' and 113_1b' may be formed on a bottom surface of the cap plate 113 as well. In a case where the first grooves 113_1a and 113_1b are formed on both of the top and bottom surfaces of the cap plate 113, the first grooves 113_1a and 113_1b may be located so as not to correspond to or overlie each other, i.e., the first grooves on the top surface and bottom surface of the cap plate 113 may be vertically offset relative to one another. For example, if the first grooves 113_1a and 113_1b were formed on the top and bottom surfaces of the cap plate 113 and were located to correspond to or overlie each other, the cap plate 113 may have a region that is considerably thin, undesirably lowering the stability.

As shown in FIGS. 3(a) and 3(b), the first grooves 113_1a and 113_1b may be at a periphery of a terminal hole 113a so as not to contact an edge (Ecap) of the cap plate 113 and the terminal hole 113a. For example, the first grooves 113_1a and 113_1b may be between a short side P4 of the terminal hole 113a and a halfway portion P2 of the central portion P1 of the cap plate 113 and a short side P3 of the cap plate 113. For example, the first grooves 113_1a and 113_1b may be between the halfway portion P2 and the short side P4 so as not to contact the edge Ecap of the cap plate 113 and the terminal hole 113a. The first grooves 113_1a and 113_1b may be at a location near or adjacent to the terminal hole 113a. For example, the first grooves 113_1a and 113_1b may be at a location spaced apart from the terminal hole 113a by at least as much as a distance that is substantially equal to a width of the terminal hole 113a.

As shown in FIGS. 3(a) and 3(b), the first grooves 113_1a and 113_1b may have a length (La) in the Y-axis direction, which may be longer than a width (W1) in the Y-axis direction of the first electrode terminal 115 and shorter than a width (W2) in the Y-axis direction of the terminal hole 113a. For example, the width W2 of the terminal hole 113a may correspond to a length of the short side of the terminal hole 113a.

In addition, the length La of the first grooves 113_1a and 113_1b (in the Y-axis direction) may be about 50% to about 70% of a width (W3) (in the Y-axis or minor axis direction) of the cap plate 113. For example, when the width W3 of the cap plate 113 in the Y-axis direction is 5 mm, the length La of the first grooves 113_1a and 113_1b in the Y-axis direction may be about 3.5 mm.

The first grooves 113_1a and 113_1b may have a width (Wa) in the X-axis direction of about 0.5 mm to about 1 mm. Maintaining the width Wa of the first grooves 113_1a and 113_1b at about 1 mm or less may help prevent a deterioration in a drop characteristic of the bare cell 110. Thus, the width Wa of the first grooves 113_1a and 113_1b in the X-axis direction may be about 0.5 mm to about 1 mm, irrespective of a length (L3) of the cap plate 113 in the X-axis direction. Here, the drop characteristic of the bare cell 110 refers to a probability of the bare cell 110 being damaged when the bare cell 110 is dropped at a predetermined height. Deterioration in the drop characteristic of the bare cell 110 suggests that the probability of the bare cell 110 being damaged is increased when the bare cell 110 is dropped at a predetermined height.

As shown in FIG. 3(c), the first grooves 113_1a and 113_1b may have a depth (Da), which may be about 20% to about 50% of a thickness (D3) of the cap plate 113. For example, when the thickness D3 of the cap plate 113 is 1 mm, the depth Da of the first grooves 113_1a and 113_1b may be about 0.3 mm.

Figure 4:
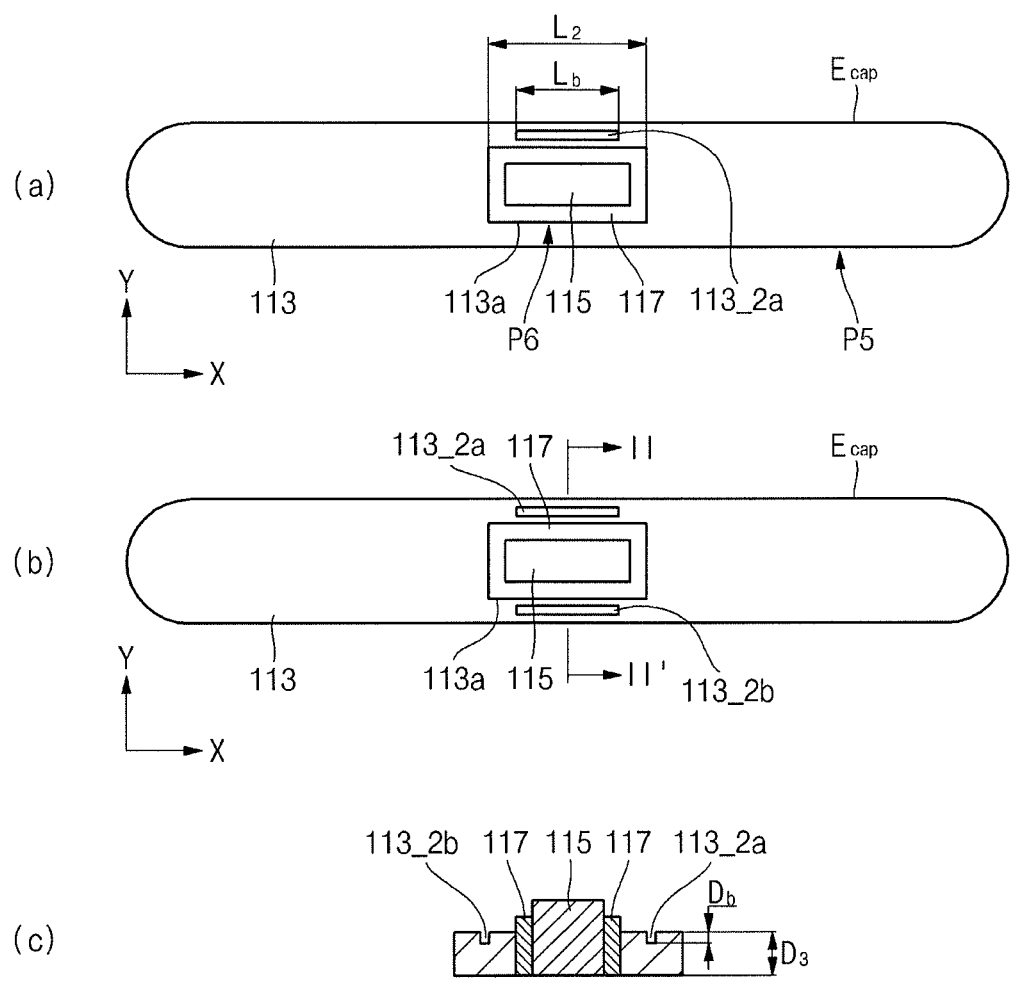
FIG. 4 illustrates a view of a configuration of second grooves in a cap plate according to an embodiment.

FIG. 4 illustrates a view of a configuration of second grooves (113_2a and 113_2b) in the cap plate (113) according to an embodiment. For example, FIGS. 4(a) and 4(b) illustrate top views of the cap plate 113, and FIGS. 4(c) and 4(d) illustrate sectional views of the cap plate 113 taken along the line II-II' of FIG. 4(b). For a better understanding of second grooves 113_2a and 113_2b, the first electrode terminal 115 and the insulation gasket 117 are both shown in FIG. 4.

As shown in FIGS. 4(a) and 4(b), the bending induction groove of the cap plate 113 may include at least one second groove, e.g., second grooves 113_2a and 113_2b, extending in parallel with a lengthwise direction (e.g., major axis or X-axis direction) of the cap plate 113. For the sake of convenient explanation, the second grooves 113_2a and 113_2b will be described below by defining the same as a first_second groove 113_2a and a second_second groove 113_2b according to the location at which they are formed in view of the terminal hole 113a. For example, as shown in FIG. 4(a), the first_second groove 113_2a may be adjacent to the terminal hole 113a and spaced apart from the terminal hole 113a in the Y-axis direction. In addition, as shown in FIG. 4(b), the second_second groove 113_2b may also be adjacent to the terminal hole 113a and spaced apart from the terminal hole 113a in the Y-axis direction. For example, the second grooves 113_2a and 113_2b may extend along at least one of both sides of the terminal hole 113a.

FIG. 4 shows that one of the second grooves 113_2a and 113_2b may be formed at one side of the terminal hole 113a, and/or another of the second grooves 113_2a and 113_2b may be formed at another side of the terminal hole 113a. However, in an implementation, one or more of the second grooves 113_2a and 113_2b may be formed at one side or both sides of the terminal hole 113a. For example, a multitude or plurality of first_second grooves 113_2a may be formed along the terminal hole 113a and spaced apart from the terminal hole 113a in the Y-axis direction. In an implementation, a multitude of second_second grooves 113_2b may be formed along the terminal hole 113a and spaced apart from the terminal hole 113a in the Y-axis direction. In another implementation, a multitude of first_second grooves 113_2a and a multitude of second_second grooves 113_1b may be formed along the terminal hole 113a and spaced apart from the terminal hole 113a in the Y-axis direction.

In addition, FIG. 4 shows that the second grooves 113_2a and 113_2b are formed in such a manner as indicated by solid lines, e.g., as distinct, continuous grooves. However, in an implementation, the second grooves 113_2a and 113_2b may be formed in such a manner as indicated by dotted lines or a combination of solid and dotted lines, e.g., as discontinuous grooves.

FIGS. 4(a) to 4(c) show that the second grooves 113_2a and 113_2b may be formed on a top surface of the cap plate 113. However, in an implementation, the second grooves 113_2a and 113_2b may also be formed on a bottom surface of the cap plate 113 (not illustrated) or on both of the top and bottom surfaces of the cap plate 113 (not illustrated). In a case where the second grooves 113_2a and 113_2b are formed on both of the top and bottom surfaces of the cap plate 113, the second grooves 113_2a and 113_2b may be located so as not to correspond to or overlie each other, i.e., the second grooves on the top surface and bottom surface of the cap plate 113 may be vertically offset relative to one another. For example, if the second grooves 113_2a and 113_2b were formed on the top and bottom surfaces of the cap plate 113 and were located to correspond to or overlie each other, the cap plate 113 may have a region that is considerably thin, undesirably lowering the stability.

As shown in FIGS. 4(a) and 4(b), the second grooves 113_2a and 113_2b may be at a periphery of the terminal hole 113a so as not to contact an edge (Ecap) of the cap plate 113 and a terminal hole 113a. For example, the second grooves 113_2a and 113_2b may be between a long side P5 or edge Ecap of the cap plate 113 and a long side P6 of the terminal hole 113a. Here, a portion between the long side P5 or edge Ecap of the cap plate 113 and the long side P6 of the terminal hole 113a refers to a region excluding the long side P5 or edge Ecap of the cap plate 113 and the long side P6 of the terminal hole 113a. For example, the second grooves 113_2a and 113_2b_1b may be adjacent to but not contacting the long side P5 or edge Ecap of the cap plate 113 or the long side P6 of the terminal hole 113a, so that the long side P5 or edge Ecap of the cap plate 113 or the long side P6 of the terminal hole 113a are not stepped at corners or edges. The long side P5 or edge Ecap of the cap plate 113 may be welded to a top end of a case 111. If the second grooves 113_2a and 113_2b were to be at the long side P5 or edge Ecap of the cap plate 113, portions of the second grooves 113_2a and 113_2b may be undesirably melted down by a welding heat. Accordingly, the second grooves 113_2a and 113_2b may be deformed, and an undesirable coupling failure between the cap plate 113 and the case 111 may occur. Therefore, the second grooves 113_2a and 113_2b may be spaced apart in the Y-axis direction from the long side P5 or edge Ecap of the cap plate 113 and the long side P6 of the terminal hole 113a. For example, the second grooves 113_2a and 113_2b may be at a location spaced apart in the Y-axis direction from the long side P5 or edge Ecap of the cap plate 113 and the long side P6 of the terminal hole 113a, respectively, by at least as much as a distance that is substantially equal to a width of the second grooves 113_2a and 113_2b.

As shown in FIGS. 4(a) and 4(b), the second grooves 113_2a and 113_2b may have a length (Lb) in the X-axis direction, which may be shorter than a length (L2) of the terminal hole 113a in the X-axis direction.

As shown in FIG. 4(c), the second grooves 113_2a and 113_2b may have a depth (Db), which may be about 20% to about 50% of a thickness (D3) of the cap plate 113. For example, when the thickness D3 of the cap plate 113 is 1 mm, the depth Da of the second grooves 113_2a and 113_2b may be about 0.3 mm.

Figure 5:
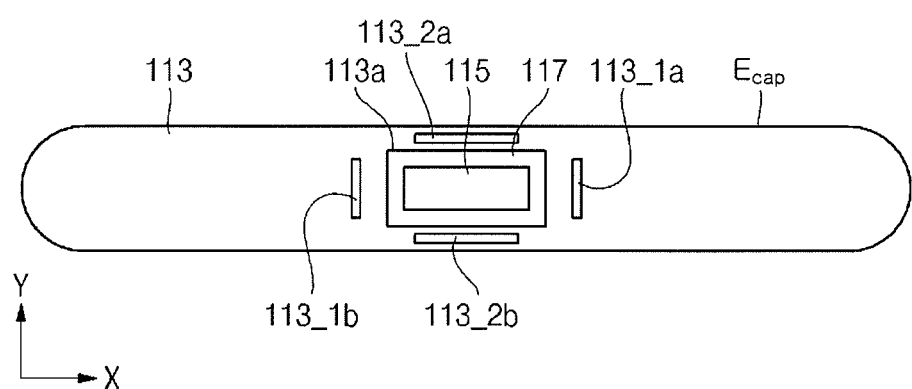
FIG. 5 illustrates a top view of first grooves and second grooves in a cap plate according to an embodiment.

FIG. 5 illustrates a top view of first grooves (113_1a and 113_1b) and second grooves (113_2a and 113_2b) in the cap plate (113) according to an embodiment.

As shown in FIG. 5, first grooves 113_1a and 113_1b and second grooves 113_2a and 113_2b may be formed together on a cap plate 113. FIG. 5 shows that the first grooves 113_1a and 113_1b and the second grooves 113_2a and 113_2b may extend along the Y-axis and the X-axis, respectively. In an implementation, at least one of a first_first groove 113_1a and a second_first groove 113_1b, and at least one of a first_second groove 113_2a and a second_second groove 113_2b may be included together on the cap plate 113.

Table 1, below, shows comparison results of compression tests performed on a battery cell group A with a bending induction groove formed on a cap plate according to an embodiment and a comparative battery cell group B without a bending induction groove.

TABLE 1

| Cell group | Number of centrally bent cells | Number of laterally ruptured or bent/ignited cells | Total |
| --- | --- | --- | --- |
| A | 40 | — | 40 |
| B | 30 | 10/7 | 40 |

In Table 1, the compression tests were performed by laterally applying a compressive force until structural deformation occurred to the battery cell groups A and B, and the number of centrally bent cells, the number of ruptured or bent cells having centers or edges, and the number of ignited cells among the ruptured or bent cells, are listed as the compression test results for comparison.

Referring to Table 1, showing the compression test results, in the battery cell group A with a bending induction groove, all 40 cells were centrally bent. In the comparative battery cell group B, 30 of 40 cells were centrally bent and the rest (10 cells) of the total cells were ruptured or bent at their edges, and 7 of the 10 cells were ignited. Here, edge portions of a case were ruptured by the laterally applied compressive force and portions of ruptured case pierced the electrode assembly, so that positive and negative electrode plates were shorted, resulting in ignition of cell.

As shown in Table 1, when the battery cell group A with a bending induction groove is compared with the comparative battery cell group B without a bending induction groove, the battery cell group A is definitely higher than the comparative battery cell group B in the probability of being centrally bent, suggesting that the battery cell group A is less likely to be ignited than the conventional battery cell group B. As described above, when a compressive force is laterally applied to a battery cell, the bending induction groove may cause the bare cell to be readily bent symmetrically in a left-and-right direction, thereby suppressing rupture of the case and ignition due to the ruptured case.

Table 2, below, shows determination results of pass/fail in compression tests with varying lengths and depths of bending induction grooves.

TABLE 2

| Cell group | Length (mm) | Depth (mm) | Test result |
| --- | --- | --- | --- |
| A | 1.5 | 0.2 | 3L4 |
| B | 2.0 | 0.2 | 3L4 |
| C | 2.5 | 0.2 | 1L1, 2L4 |
| D | 3.0 | 0.2 | 2L1, 1L4 |
| E | 3.5 | 0.2 | 3L1 |
| F | 1.5 | 0.3 | 3L4 |
| G | 2.0 | 0.3 | 3L4 |
| H | 2.5 | 0.3 | 1L1, 2L4 |
| I | 3.0 | 0.3 | 2L1, 1L4 |
| G | 3.5 | 0.3 | 3L1 |

In Table 2, the compression tests were performed on battery cell groups A-G, each having a first groove formed on a cap plate having a width of 5 mm and a thickness of 1 mm. In addition, L1 and L4 shown in Table 2 indicate leakage and ignition, respectively. That is to say, L1 indicates that a bare cell passed the compression test, and L4 indicates that a bare cell failed in the compression test. In the test result, e.g., 3L4 indicates three cells were tested and all of the three cells were ignited.

Referring to Table 2, in a case where the first groove of each battery cell was formed to have a length that was about 50% to about 70% of a width of a cap plate, and a depth that was about 20% to about 50% of a thickness of the cap plate, the probability of the battery cell passing the compression test was higher than in a case where the first groove of each battery cell had a length and a depth deviating from the ranges stated above. Here, the compression test results were determined according to whether the battery cell was centrally bent or ignited. In addition, as shown in Table 2, the first groove of the battery cell having passed the compression test had a length that was shorter than a width of a terminal hole and longer than a width of an electrode terminal.

By way of summation and review, a trend has been for lithium secondary batteries to become thin even while the energy density increases. Thus, the lithium secondary battery may be vulnerable to shock and compression. When shock or compression is applied to the lithium secondary battery, the electrode assembly accommodated in the can may be deformed, and the lithium secondary battery may be ignited or exploded due to a short between the electrode plates caused by the deformation of the electrode assembly.

For example, when the lithium secondary battery is deformed by compressive force that is perpendicular to the longitudinal axis in a longitudinal compression test, which is one of the safety tests of the lithium secondary battery, a can may not be symmetrically bent in the left-and-right direction, but may be entirely compressed. Thus, the electrode assembly accommodated in the can may be subjected to locally irregular pressures, causing a short between the electrode plates of the electrode assembly, resulting in ignition or rupture.

According to the embodiments, a bending induction groove may be included in a cap plate of a battery cell, thereby causing the battery cell to be easily bent symmetrically in the left-and-right direction when a compressive force is laterally applied, thereby increasing the probability of the battery cell being centrally bent. Accordingly, the rupture of a case of the battery cell and ignition due to the ruptured case may be suppressed.

The embodiments provide a secondary battery having improved stability by reducing and/or preventing a short between an electrode assembly and an electrode plate and explosion due to the short by folding the secondary battery about its longitudinal axis when a compressive force is laterally applied.

For example, the embodiments provide a secondary battery having improved stability by preventing a short between an electrode assembly and an electrode plate and explosion due to the short by causing the secondary battery to be symmetrically bent in the left-and-right direction about its longitudinal axis when a compressive force is laterally applied.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a case accommodating the electrode assembly;
a cap plate covering the case; and
an electrode terminal electrically connected to the electrode assembly,
wherein the cap plate includes at least one bending induction groove at a periphery of a central portion of the cap plate in a region between an edge and the central portion of the cap plate,
wherein the bending induction groove is on both a top surface and a bottom surface of the cap plate, and
wherein the bending induction groove on the top surface of the cap plate and the bending induction groove on the bottom surface of the cap plate do not correspond to each other.

2. The secondary battery as claimed in claim 1, wherein the cap plate includes a terminal hole at the central portion of the cap plate, the electrode terminal being exposed to the outside of the cap plate through the terminal hole.

3. The secondary battery as claimed in claim 2, wherein the bending induction groove includes at least one first groove parallel with a widthwise direction of the cap plate.

4. The secondary battery as claimed in claim 3, wherein the at least one first groove is at least one of both sides of the terminal hole.

5. The secondary battery as claimed in claim 3, wherein the at least one first groove is between a short side of the terminal hole and a halfway portion of the central portion and a short side of the cap plate.

6. The secondary battery as claimed in claim 3, wherein the at least one first groove has a length that is longer than a width of the electrode terminal and that is shorter than a width of the terminal hole.

7. The secondary battery as claimed in claim 3, wherein the at least one first groove has a length that is 50% to 70% of a width of the cap plate.

8. The secondary battery as claimed in claim 3, wherein the at least one first groove has a width of 0.5 mm to 1 mm.

9. The secondary battery as claimed in claim 3, wherein the at least one first groove has a depth that is 20% to 50% of a thickness of the cap plate.

10. The secondary battery as claimed in claim 2, wherein the bending induction groove includes at least one second groove parallel with a lengthwise direction of the cap plate.

11. The secondary battery as claimed in claim 10, wherein the at least one second groove is at least one of both sides of the terminal hole.

12. The secondary battery as claimed in claim 10, wherein the at least one second groove is between a long edge of the cap plate and a long side of the terminal hole.

13. The secondary battery as claimed in claim 10, wherein the at least one second groove has a length that is shorter than a length of the terminal hole.

14. The secondary battery as claimed in claim 10, wherein the at least one second groove has a depth that is 20% to 50% of a thickness of the cap plate.

15. The secondary battery as claimed in claim 2, wherein the bending induction groove includes:
    at least one first groove parallel with a widthwise direction of the cap plate, and
    at least one second groove parallel with a lengthwise direction of the cap plate.

16. The secondary battery as claimed in claim 15, wherein:
    the at least one first groove is between a short side of the terminal hole and a halfway portion of the central portion and a short side of the cap plate, and
    the at least one second groove is between a long edge of the cap plate and a long side of the terminal hole.

17. The secondary battery as claimed in claim 15, wherein:
    the at least one first groove has a length that is longer than a width of the electrode terminal and that is shorter than a width of the terminal hole, and
    the at least one second groove has a length that is shorter than a length of the terminal hole.

18. The secondary battery as claimed in claim 1, wherein the bending induction groove on the top surface of the cap plate is vertically offset relative to the bending induction groove on the bottom surface of the cap plate.

* * * * *